J. W. NEILL.
GOLD SAVING APPARATUS.
APPLICATION FILED APR. 21, 1913.

1,100,904.

Patented June 23, 1914.
2 SHEETS—SHEET 1.

Witnesses:
J. D. Thornburgh
Sully Russo

Inventor.
James W. Neill.
by Ryan & Hackley
attys

J. W. NEILL.
GOLD SAVING APPARATUS.
APPLICATION FILED APR. 21, 1913.
1,100,904.
Patented June 23, 1914.
2 SHEETS—SHEET 2.
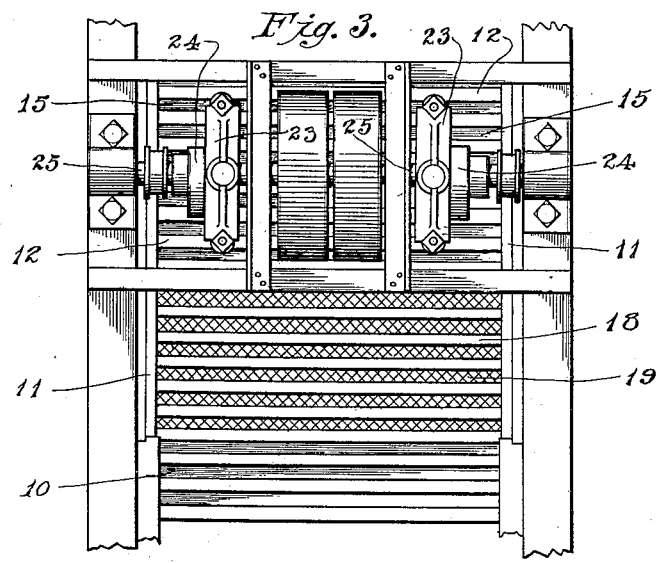
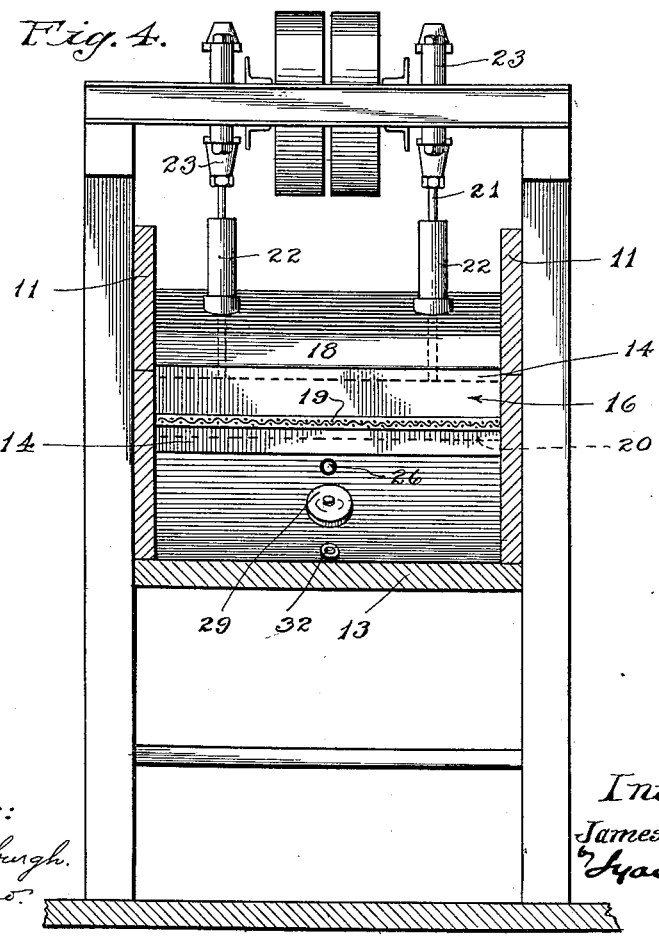
Witnesses:
J. D. Thornburgh.
Sully Russo.
Inventor:
James W. Neill.
Lyon Hackley
atty

UNITED STATES PATENT OFFICE.

JAMES W. NEILL, OF PASADENA, CALIFORNIA.

GOLD-SAVING APPARATUS.

1,100,904. Specification of Letters Patent. Patented June 23, 1914.

Application filed April 21, 1913. Serial No. 762,728.

*To all whom it may concern:*

Be it known that I, JAMES W. NEILL, a citizen of the United States, residing at Pasadena, in the county of Los Angeles and State of California, have invented a new and useful Gold-Saving Apparatus, of which the following is a specification.

This invention is intended for use in connection with riffles in which the gold and other metals or minerals are separated from sand, gravel, etc., by the action of running water passing over an inclined surface carrying the riffles. In such apparatus there is a tendency for the riffles to become clogged or packed with heavy fine material such as black sand, preventing the riffles from performing their function of separating the gold or metallic values and allow the gold or values to pass over the riffles into the tailings.

The main object of the present invention is to avoid the loss of gold and other values resulting from such clogging of the riffles and to provide means whereby the material in its passage along the riffles is subjected to a jigging operation which effectively separates the gold and prevents packing of the black sand.

Other objects of the invention will appear hereinafter.

Figure 1:
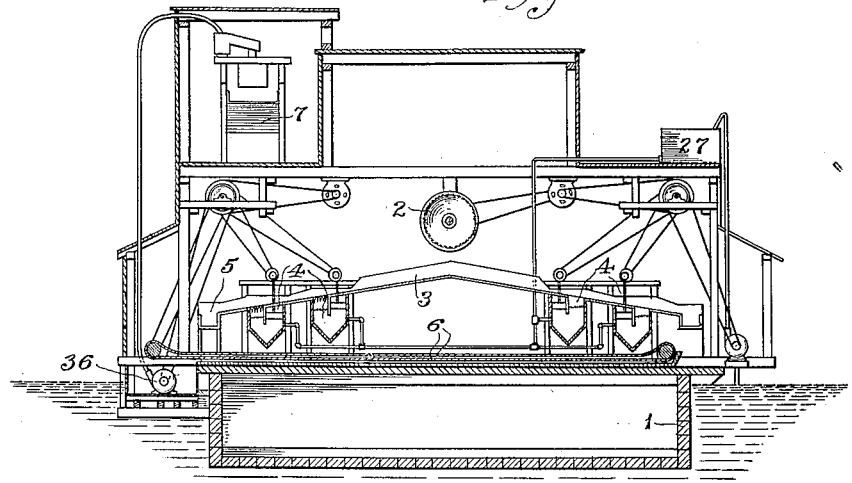
Figure 2:
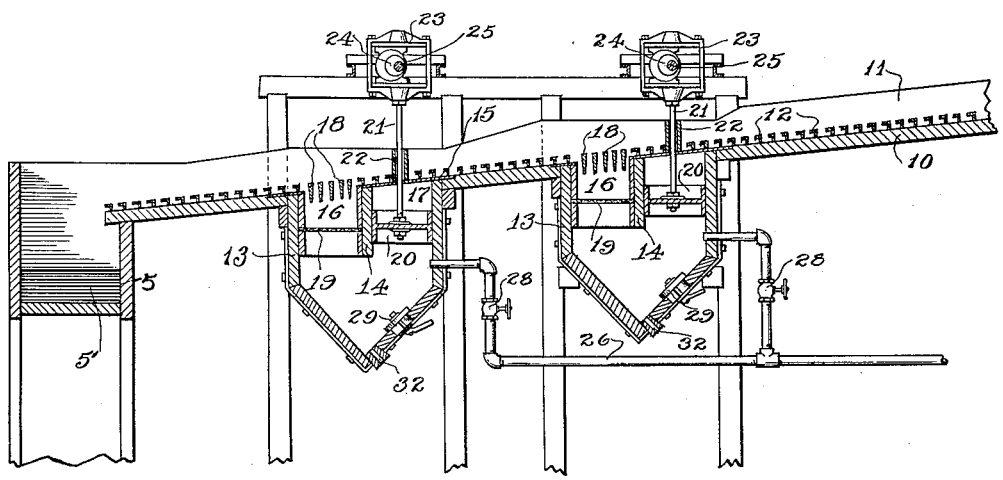

The accompanying drawings illustrate an embodiment of the invention, and referring thereto:

Figure 1 is a vertical section of the complete apparatus including the riffles, jigging devices, and means for recovering the values separated from the materials by the jigging devices. Fig. 2 is a vertical section of the lower end of the riffles, showing the jigging devices therein. Fig. 3 is a plan view of one of the jigging devices. Fig. 4 is a vertical section thereof.

Referring to Fig. 1, the apparatus comprises, for example, a dredger body 1, suitable means such as a drum 2 to which the gold bearing material is supplied by the usual dredging and elevating means, said drum operating as a rotary screen for the material, riffles 3 adapted to receive the screened material from said drum, jigging devices 4 forming a part of said riffles, discharge sluiceways 5 for carrying away the tailings from the riffles, a conveyer 6 for receiving the material separated by the jigging devices, and suitable apparatus 7 for separating the values from such material, delivered there by suitable elevating means such as pump 36. It will be understood, that, in practice, the riffles 3 are arranged in sections, side by side, only one section being here shown, at each side of the center.

The riffles 3 may be of any usual or suitable form, comprising, for example, an inclined floor or riffle surface 10, side walls 11 for said surface and cross strips 12 on said floor forming the obstructing riffles for the material. At suitable points in the riffle, for example, near the lower end, are interposed one or more jigging devices, two of such devices being here shown, and it will be understood that any desired number may be used. Each jigging device comprises a box or casing 13 extending transversely of the riffle section and below the riffle surface, and a partition 14 extending within said box or casing and dividing the interior thereof into two vertical chambers 16 and 17 extending side by side and communicating at their lower ends, each of said chambers extending the entire width of the riffle section, said chamber 16 constituting a jigging compartment and being open at the top, so as to communicate with the space through which the water and material is passing over the riffle, and the other chamber 17 constituting a piston chamber and being closed at the top by a plate 15 which extends in the inclined plane of the riffle floor, cross bars or riffle strips 12 being provided on top of this plate so as to form a portion of the riffle means. Cross bars 18 are also provided at the top of the chamber 16 which act in the manner of riffle strips in obstructing the flow of material while permitting a vertical jigging motion of the material. The upper edges of these cross bars 18 are located in the same inclined plane as the upper edges of the riffle strips 12, and the jigging chamber is located in advance of some of the riffle strips 12, as well as in advance of the riffle strips 5' in the continuation 5 of the riffleway, while other of the riffle strips 12 are located in advance of the jigging chamber, so that the riffle strips 12 and the cross bars 18 form a continuous inclined series of riffle members. A screen 19 is provided in the jigging chamber 16 to aid in retaining a bed of material in position in said chamber, while allowing vertical movement of the water for the jigging operation and downward movement of the fine gold, black sand, and other valuable minerals or metals. A piston 20 works vertically in the chamber 17, being operated by suitable means such as piston rods 21 connected thereto and extending through fixed sleeves 22, the upper ends of said piston rods being connected to cross heads 23 with which engage eccentrics 24 on a shaft 25 operated by any suitable mechanism. Means are provided for supplying water to the respective jigging devices, said means consisting, for example, of a pipe 26 leading to a source of water pressure, for example, a tank 27 and communicating through valves 28 with the interior of the respective boxes 13. Said boxes may be provided with outlets 32 for separated material and with removable doors or man-hole closures 29 for facilitating access thereto for purposes of repair or cleaning. The jigging device or devices may be located at any desired position in the inclined riffle and I have secured good results by use of a single jigging device placed at the extreme lower end of the riffle. In order, however, to insure a maximum saving of gold, it is in some cases preferable to provide a plurality of jigging devices located somewhat above the lower end of the riffle, so as to permit of a certain amount of riffle action subsequent to the jigging action.

The operation is as follows: Gold bearing material such as gravel is supplied to the screen 2 in the usual manner, and the screenings fall onto the upper ends of the riffle floors 3 and are washed down over the riffles by the action of water supplied along with the said material. Coarse gold is readily separated by the riffles, but the finer gold has a tendency to pass over the riffles into the sluiceways 5 and this tendency is accentuated by the tendency of the riffles to become clogged by black sand. When any riffle becomes clogged in this manner, the fresh material passing down over the riffle does not enter between the riffles, but passes over the top of the riffles without any riffling action thereon. Any such material eventually reaches one of the jigging devices and passing over the jigging chamber 16 thereof is subjected to a jigging action in the following manner: The water in the box or casing 13 is kept in a state of movement by vertical operation of the piston 20 in such manner that the water in the chamber 16 moves alternately upward and downward. The upward movement of the water tends to break up or loosen any bed of black sand that may form between the riffle bars 18. The succeeding downward movement of the water tends to draw the finer and heavier materials downwardly along with the water. The jigging action is, therefore, twofold,—first, in loosening up the material between the riffle bars 18 so as to enable the bars to operate as riffles and as a portion of the riffleway, and secondly, to draw down out of the body of material between said riffle bars, the finer and heavier particles including the gold, platinum and some of the black sand. By reason of their function as riffle bars, bars 18 tend to hold back or retain a certain portion of the gold and this portion is immediately withdrawn downwardly in the next succeeding downward movement of the water. The gold which is not caught or retained by these bars 18 passes on to the succeeding portions of the riffleway and into sluiceway 5 and is subjected therein to further riffle action to recover a further amount of gold, the sluiceway being provided with riffle bars 5' for producing a further riffle action. This further riffling action is rendered more efficient by the previous removal of a portion of the black sand by the jigging device. This trapping out or elimination of black sand from the material, by operation of jigging devices interpolated in the riffleway, including the riffles proper and the riffled sluiceway, is an important feature of my invention, as it permits the riffles to act more effectively on the the material by reason of the freeing of the material from the obstructing black sand. In case more than one jigging device is used, said devices operate successively on the material to remove successive portions of the gold and of the black sand. The material separated from the main body of the material passing down the riffleway, by means of the jigging device passes to the lower part of the box or casing 13 and may be drawn off continuously or from time to time as desired through the outlet 32 at the bottom of said box. Said material in general contains a considerable amount of values and in order to save the same, the material is conveyed by the conveyer 6 and pump 36 or by any other suitable device or devices to the separating devices 7, which may be of any suitable form or type such as amalgamating plates, cocoa matting, concentrating tables or other devices suitable for separating gold from black sand. Water is supplied through the pipe 26 in sufficient quantity to make up for the outflow of water through outlet 32 along with the separated material, and for loss of water due to action of the piston, but not in sufficient quantity to produce material hydraulic action, it being a feature of the present invention that the presence of the jigging device does not affect the amount of water in the riffleway or the riffling operation, except in preventing packing. In case the jigging device ceases to operate for any reason, the riffleway may still be operated in its normal or usual manner, the parts over the jigging device then operating like the rest of the riffleway.

The device above described not only separates the black sand from the other material, but screens it so as to provide for most effective treatment by other processes if desired.

What I claim is:

1. In combination, an inclined sluice, a jigging compartment interposed intermediate the ends of the sluice, means for producing a reciprocating current of water in said jigging compartment, and an uninterrupted series of closely spaced riffle elements in a common plane throughout the sluice and over the jigging compartment.

2. The combination with an inclined riffleway provided with a series of transverse riffles, of a jigging device interposed in said riffleway in such manner that some of such riffles are located in advance of said jigging device, and said jigging device is located in advance of other of said riffles, said jigging device comprising a box having a jigging chamber open at its top into the riffleway, means for producing a vertical reciprocating movement of water in said chamber, and riffles extending transversely of the riffleway at the top of said jigging chamber, the upper edges of said riffles being located in the same inclined plane as the upper edges of the aforesaid riffles in the riffleway, so as to form a continuous series of riffles.

3. The combination of an inclined riffleway provided with a series of transverse riffles, of a jigging device interposed in said riffleway and comprising a chamber open at its upper end into said riffleway, and riffles extending transversely at the top of said chamber and constituting in connection with the aforesaid riffles, a continuous series of riffles, and means for producing the vertical reciprocation of water in said chamber.

In testimony whereof, I have hereunto set my hand at Los Angeles, California, this 12th day of April, 1913.

JAMES W. NEILL.

In presence of—
ARTHUR P. KNIGHT,
MARTHA M. LANGE.